United States Patent
Jeon et al.

(10) Patent No.: US 10,534,206 B2
(45) Date of Patent: Jan. 14, 2020

(54) LIQUID CRYSTAL DISPLAY (71) Applicant: Samsung Display Co., Ltd., Yongin, Gyeonggi-Do (KR)

(72) Inventors: Young Jae Jeon, Daejeon (KR); Yun Hee Kwak, Hwaseong-si (KR); Hyoung-joon Kim, Yongin-si (KR); Jae Ho Choi, Asan-si (KR); Kyung Hyun Kim, Asan-si (KR); Jong Woong Chang, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 112 days.

(21) Appl. No.: 14/728,710

(22) Filed: Jun. 2, 2015

(65) Prior Publication Data
US 2016/0195740 A1 Jul. 7, 2016

(30) Foreign Application Priority Data
Jan. 6, 2015 (KR) .................. 10-2015-0001402

(51) Int. Cl.
*G02F 1/13* (2006.01)
(52) U.S. Cl.
CPC .................. *G02F 1/1309* (2013.01)
(58) Field of Classification Search
None
See application file for complete search history.

(56) References Cited

U.S. PATENT DOCUMENTS

| | | | | |
|---|---|---|---|---|
| 5,019,001 A | * | 5/1991 | Abe | G02F 1/1309 216/21 |
| 5,724,107 A | * | 3/1998 | Nishikawa | G02F 1/136213 349/110 |
| 6,734,925 B1 | * | 5/2004 | Lee | G02F 1/1345 349/40 |
| 6,861,665 B2 | * | 3/2005 | Kim | G02F 1/1309 257/48 |
| 7,129,520 B2 | * | 10/2006 | Kim | G02F 1/1309 257/48 |
| 7,304,713 B2 | | 12/2007 | Yi | |
| 7,440,072 B2 | | 10/2008 | Park et al. | |
| 2002/0051114 A1 | * | 5/2002 | Kwak | G02F 1/1309 349/192 |
| 2002/0089614 A1 | * | 7/2002 | Kim | G02F 1/1309 349/40 |
| 2004/0095549 A1 | * | 5/2004 | Moon | G02F 1/1345 349/192 |
| 2011/0310342 A1 | | 12/2011 | Kim et al. | |
| 2012/0056186 A1 | * | 3/2012 | Shirouzu | G02F 1/136204 257/59 |

FOREIGN PATENT DOCUMENTS

| | | |
|---|---|---|
| KR | 10-0294684 B1 | 4/2001 |
| KR | 10-1027887 B1 | 3/2011 |
| KR | 10-2013-0063886 A | 6/2013 |

* cited by examiner

*Primary Examiner* — Paresh Patel
(74) *Attorney, Agent, or Firm* — H.C. Park & Associates, PLC (57) ABSTRACT

A liquid crystal display, including: a liquid crystal panel; and a visual inspection unit positioned in an outer region of the liquid crystal panel and transferring a test signal to the liquid crystal panel, in which the visual inspection unit includes: a test pad to which a test signal is applied; a first test line connected to the test pad; and a second test line connected to the test pad through a bridge line.

7 Claims, 7 Drawing Sheets

LIQUID CRYSTAL DISPLAY

CLAIM OF PRIORITY

This application makes reference to, incorporates the same herein, and claims all benefits accruing under 35 U.S.C. § 119 from an application earlier filed in the Korean Intellectual Property Office on the 6 of Jan. 2015 and there duly assigned Serial No. 10-2015-0001402.

BACKGROUND OF THE INVENTION

Field of the Invention
A liquid crystal display is provided.
Description of the Related Art Recently, as a liquid crystal display is implemented by a narrow bezel, a size of a signal wire and a pad at an outside portion of the liquid crystal display has been reduced. As a result, a bump end of a chip on glass (COG) is implemented as a fine pattern and visual inspection of the liquid crystal display is performed instead of a cell test which is the existing driving test method of the liquid crystal display.

For the visual inspection, separate inspection lines connected to a gate line and a data line are installed on a thin film transistor substrate in a gate driving chip unit and a data driving chip unit and a test pad is installed between the gate driving chip and the data driving chip. Next, a signal is applied to the inspection line to test an operation state of the liquid crystal display.

For the visual inspection, the test pad and the signal line need to be installed at the outside portion of the liquid crystal display. However, in the case of the liquid crystal display to which the narrow bezel is applied, a space in which the test pad and the signal line are disposed may be insufficient. Further, when the test pad and the signal line are installed at the outside portion of the liquid crystal display, a tolerance margin may be reduced at the time of performing scribing and laser trimming.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a liquid crystal display having advantages of reducing the number of pads for visual inspection of the liquid crystal display.

The present invention has been made in an effort to provide a liquid crystal display having advantages of reducing an inflow of static electricity occurring at the time of visual inspection.

The present invention has been made in an effort to provide a liquid crystal display having advantages of easily aligning a pad and a jig pin of the liquid crystal display at the time of visual inspection.

In addition to the above-mentioned objects, the exemplary embodiment of the present invention may be used forDeletedTextsother objects that are not mentioned in detail.

An exemplary embodiment of the present invention provides a liquid crystal display including: a liquid crystal panel; and a visual inspection unit positioned in an outer region of the liquid crystal panel and transferring a test signal to the liquid crystal panel, in which the visual inspection unit includes: a test pad to which a test signal is applied; a first test line connected to the test pad; and a second test line connected to the test pad through a bridge line.

The visual inspection unit may further include a plurality of test pads to which a plurality of test signals are applied and a plurality of test lines connected to the plurality of test pads.

The first test line and the second test line may transfer the same signal.

The test signal may be a common electrode voltage Vcom.

The first test line may transfer the common electrode voltage Vcom to the liquid crystal panel and the second test line may transfer a storage electrode voltage Vcst to the liquid crystal panel.

The test signal may be a storage electrode voltage Vcst.

The first test line may transfer the storage electrode voltage Vcst to the liquid crystal panel and the second test line may transfer the common electrode voltage Vcom to the liquid crystal panel.

The bridge line may be connected to the test pad through a first connection hole and may be connected to the second test line through a second connection hole.

The bridge line may be positioned on the same layer as an electrode layer of the liquid crystal panel.

The bridge line may be positioned on the same layer as a pixel electrode of the liquid crystal panel.

The bridge line may be made of indium tin oxide (ITO) or indium zinc oxide (IZO).

The bridge line may be a static electricity dispersion line.

According to an exemplary embodiment of the present invention, it is possible to implement the liquid crystal display having the narrow bezel by reducing the size of the outside portion of the liquid crystal display. Further, it is possible to minimize the inflow of static electricity at the time the visual inspection is performed and easily align the pad and the jig pin for the visual inspection.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive Like reference numerals designate like elements throughout the specification. In addition, the detailed description of the widely known technologies will be omitted.

It will be understood that when an element such as a layer, film, region, or substrate is referred to as being "on" another element, it can be directly on the other element or intervening elements may also be present. Further, in the specification, the word "on" means positioning on or below the object portion, but does not essentially mean positioning on the upper side of the object portion based on a gravity direction.

In the specification, unless explicitly described to the contrary, the word "comprise" and variations such as "comprises" or "comprising", will be understood to imply the inclusion of stated elements but not the exclusion of any other elements. A size, a thickness, etc., of each component illustrated in the drawings are arbitrarily illustrated for convenience of explanation and therefore the present invention is not just limited thereto.

Throughout the specification, exemplary embodiments of the present invention will be described under the assumption that the same signal is applied to a first inspection line and a second inspection line.

Figure 1:
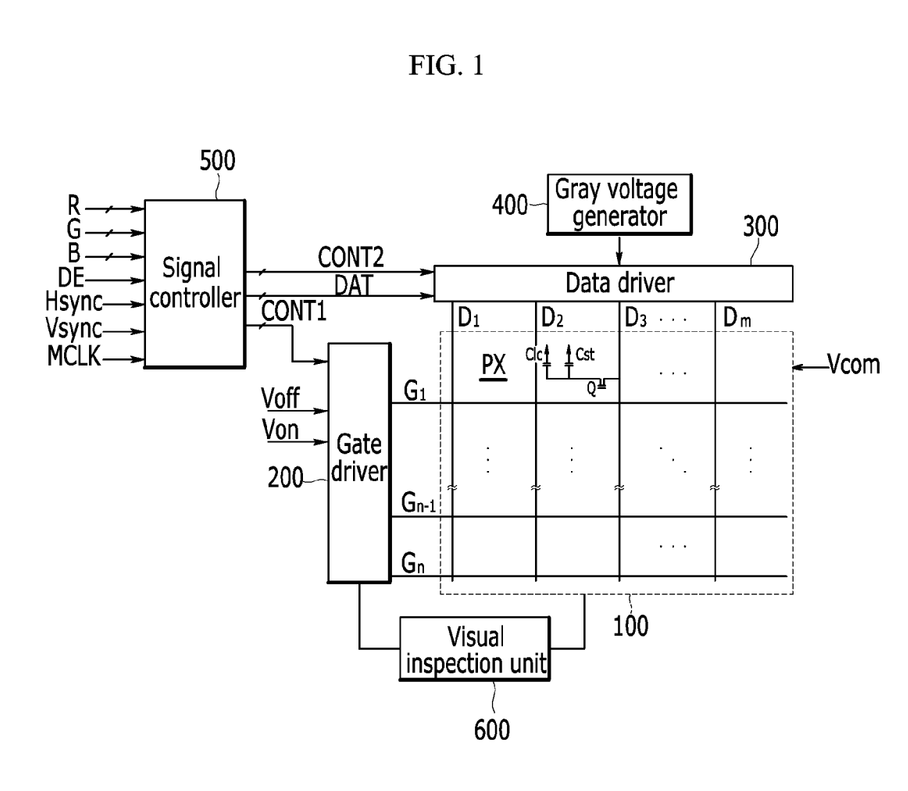
FIG. 1 is a conceptual diagram of a liquid crystal display according to an exemplary embodiment of the present invention.

FIG. 1 is a conceptual diagram of a liquid crystal display according to an exemplary embodiment of the present invention.

In FIG. 1, a liquid crystal display includes a display panel 100, a gate driver 200, a data driver 300, a gray voltage generator 400, a signal controller 500, and a visual inspection unit 600.

The display panel 100 includes a plurality of signal lines G1-Gn and D1-Dm and a plurality of pixels PXs which are arranged in a matrix form. In this case, the pixel include a switching element Q which is connected to the plurality of signal lines G1-Gn and D1-Dm. a liquid crystal capacitor Clc and a storage capacitor Cst.

The signal lines G1-Gn and D1-Dm include the plurality of gate lines G1-Gn which transfer gate signals and the plurality of data lines D1-Dm which transfer data signals.

The gate driver 200 is connected to the gate lines G1-Gn of the display panel 100 to apply the gate signals, which is a combination of a gate-on voltage Von and a gate-off voltage Voff, to the gate lines G1-Gn.

The gate driver 200 may be mounted in the display panel 100.

The data driver 300 is connected to the data lines D1 to Dm of the display panel 100 and selects a gray voltage from the gray voltage generator 400 based on a control signal of the signal controller 500 and applies the selected gray voltage to the data lines D1 to Dm.

The signal controller 500 may receive an input of an image signal R, G, B and a timing control signal from an outside. Here, the timing control signal may be a vertical sync signal Vsync, a horizontal sync signal Hsync, a main clock signal MCLK, and a data enable signal DE. The signal controller 500 may process the signals to meet the operating conditions of the display panel 100, and then generate image data DATA, a data control signal CONT2, and a scan control signal CONT1. The signal controller 500 controls the gate driver 200 and the data driver 300 with scan control signal CONT1 and data control signal CONT2, respectively.

The visual inspection unit 600 includes a plurality of test pads to which an external test signal is applied and a plurality of test lines which are each connected to the plurality of test pads and transfer the test signals to the gate driver 200 and the data driver 300. In this case, the number of test pads and test lines may be the same as each other or may not be the same as each other.

When test input signals are supplied to the plurality of test pads from external measurement apparatuses through a jig, the visual inspection unit 600 transfers the test input signals to each component through the plurality of test lines. Next, test output signals generated from each component are transferred to the plurality of test pads through the plurality of test lines and are supplied to the measurement apparatuses through the jig, thereby detecting the defect of the liquid crystal display.

The visual inspection unit 600 may output a test screen to the display panel 100 based on test signals supplied through the plurality of test pads and detect a screen display defect of the liquid crystal display with the naked eye.

In the liquid crystal display of FIG. 1, the display panel 100 is positioned in a display area and the gate driver 200, the data driver 300, the gray voltage generator 400, the signal controller 500, and the visual inspection unit 600 are positioned in an outer region around the display area.

Hereinafter, the outside inspection unit will be described with reference to FIGS. 2 to 6.

Figure 2:
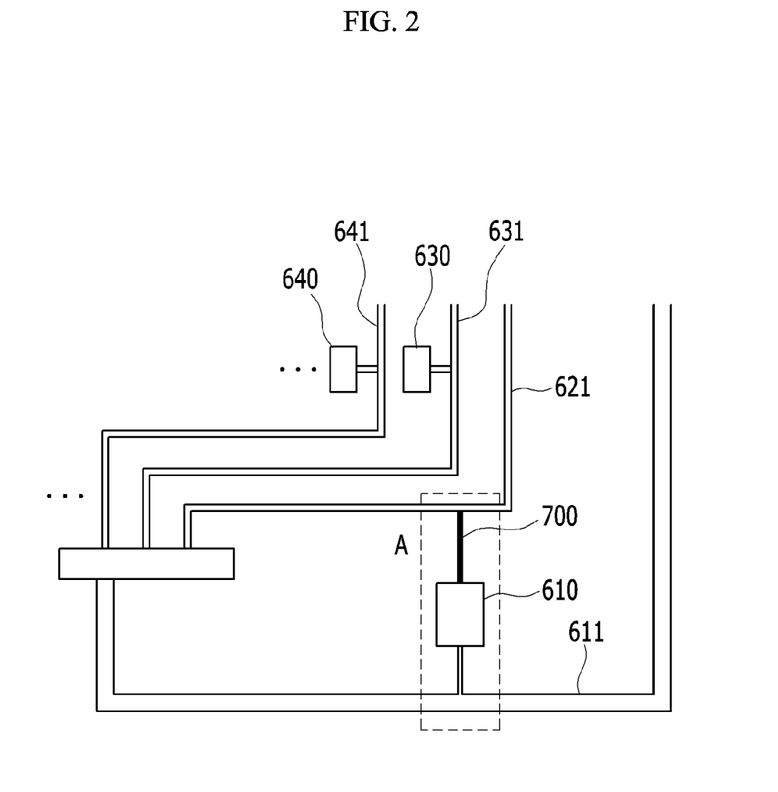
FIG. 2 is a detailed diagram illustrating a visual inspection unit according to an exemplary embodiment of the present invention.

FIG. 2 is a detailed diagram of a visual inspection unit according to an exemplary embodiment of the present invention.

In FIG. 2, the visual inspection unit 600 includes a first test pad 610, a first test line 611 which is connected to the first test pad 610, and a second test line 621 which is connected to the first test pad 610. In this case, the first test pad 610 is applied with a common electrode voltage Vcom, the first test line 611 transfers a common electrode voltage Vcom, and the second test line 621 transfers a storage electrode voltage Vcst. The first test pad 610 and the second test line 621 are connected to each other through a bridge line 700.

The visual inspection unit 600 further includes a plurality of test pads 630, 640, . . . to which test signals such as a test start signal, a test clock signal, a test gate off signal, and a test gate on signal are applied and a plurality of test lines 631, 641, . . . which are each connected to respective ones of the plurality of test pads 630, 640, . . . , to transfer the test signals to the gate driver 200 and the data driver 300.

Figure 3:
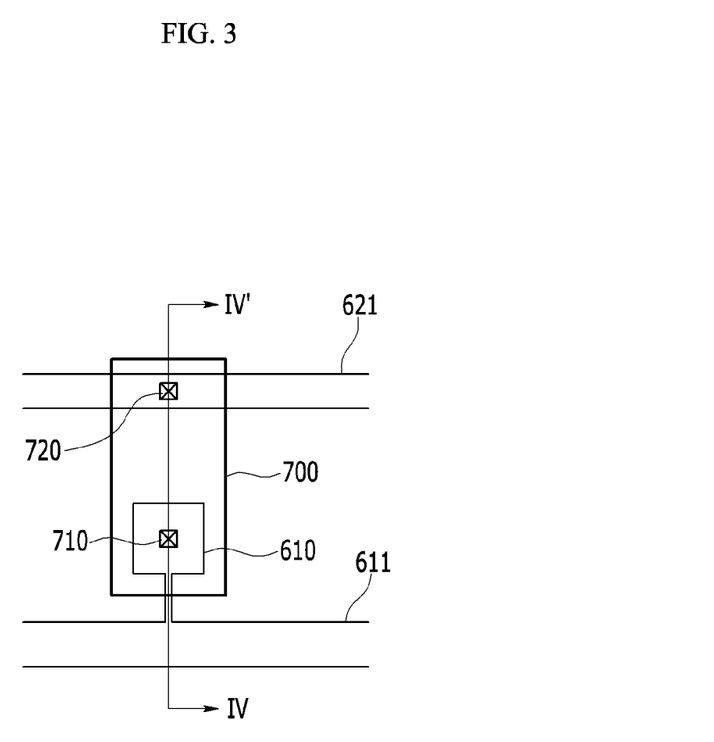
FIG. 3 is an enlarged view of portion A of FIG. 2.

FIG. 3 is an enlarged view of portion A of FIG. 2.

Reviewing FIG. 3, the first test pad 610 and the second test line 621 are connected to each other through the bridge line 700.

The bridge line 700 is connected to the first test pad 610 through a first connection hole 710 and is connected to the second test line 621 through a second connection hole 720.

When the first test pad 610 is applied with the common electrode voltage Vcom, the common electrode voltage Vcom is transferred through the first test line 611. Further, the common electrode voltage Vcom is transferred to the second test line 621 through the bridge line 700 and is transferred as the storage electrode voltage Vcst through the second test line 621.

The bridge line 700 disperses static electricity that occurs when the jig contacts the test pad, such that an inflow of static electricity through the first test line 611 for the common electrode voltage may be reduced.

Figure 4:
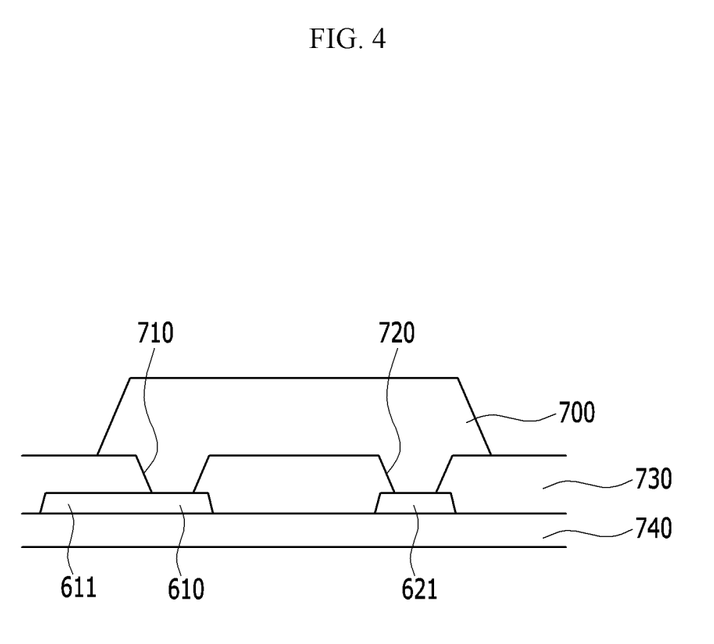
FIG. 4 is a cross-sectional view taken along the line IV-IV' of FIG. 3.

FIG. 4 is a cross-sectional view taken along the line IV-IV' of FIG. 3.

Reviewing FIG. 4, the visual inspection unit includes a substrate 740, the first test pad 610, the second test line 621, an insulating layer 730, and the bridge line 700.

The first test pad 610 and the second test line 621 are positioned on the substrate 740.

The insulating layer 730 is positioned on the substrate 740, the first test pad 610, and the second test line 621 and includes the first connection hole 710 and the second connection hole 720.

The bridge line 700 is positioned on the insulating layer 730 and is connected to the first connection hole 710 and the second connection hole 720.

The bridge line 700 is connected to the first test pad 610 for the common electrode voltage through the first connection hole 710 and is connected to the second test line 621 for the storage electrode voltage through the second connection hole 720.

The bridge line 700 may be positioned on the same layer as the electrode layer of the display panel 100.

The bridge line 700 may be positioned on the same layer as the pixel electrode of the display panel 100. Further, the bridge line 700 may be made of a transparent electrode material such as indium tin oxide (ITO) or indium zinc oxide (IZO).

Figure 5:
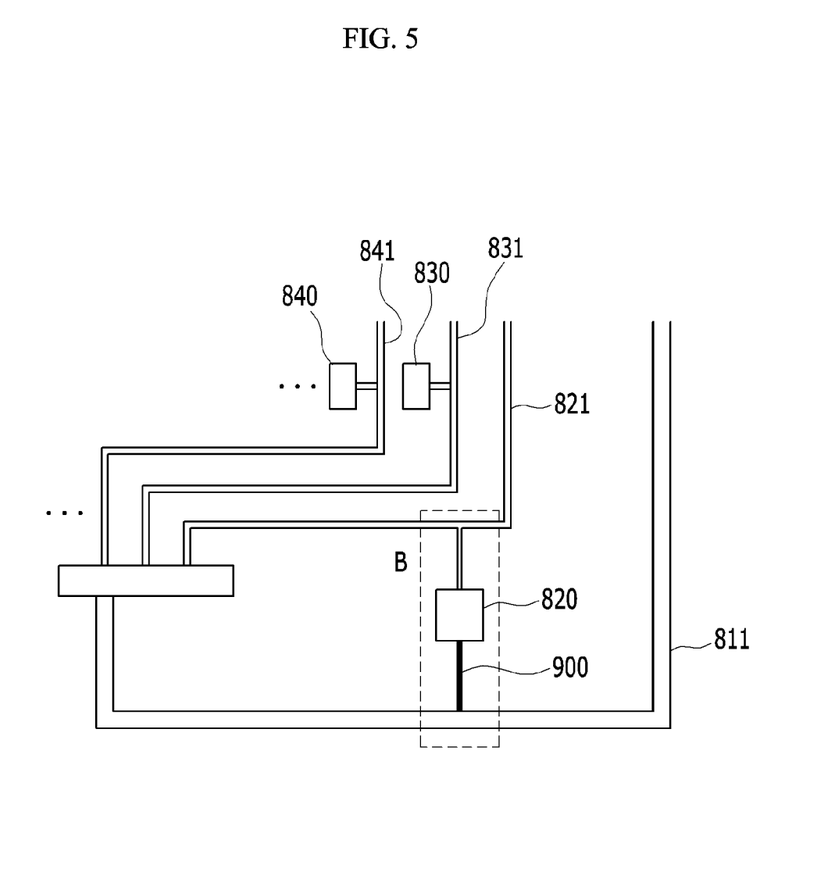
FIG. 5 is a detailed diagram of a visual inspection unit according to an exemplary embodiment of the present invention.

FIG. 5 is a detailed diagram of a visual inspection unit according to an exemplary embodiment of the present invention.

In FIG. 5, the visual inspection unit includes a second test pad 820, a first test line 811 which is connected to the second test pad 820 and a second test line 821 which is connected to the second test pad 820. In this case, the second test pad 820 is applied with the storage electrode voltage Vcst, the first test line 811 transfers the common electrode voltage Vcom, and the second test line 821 transfers the storage electrode voltage Vcst. The second test pad 820 and the first test line 811 are connected to each other through a bridge line 900.

The visual inspection unit further includes a plurality of test pads 830, 840, . . . to which test signals such as a test start signal, a test clock signal, a test gate off signal, and a test gate on signal are applied, and a plurality of test lines 831, 841, . . . which are each connected to respective ones of the plurality of test pads 830, 840, . . . , to transfer the test signals to the gate driver 200 and the data driver 300.

Figure 6:
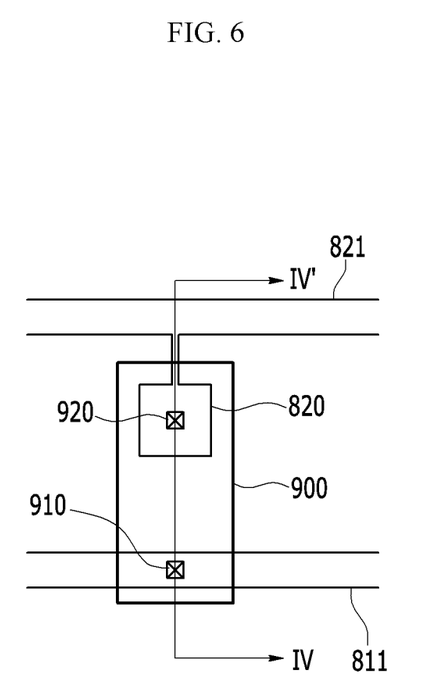
FIG. 6 is an enlarged view of portion B of FIG. 5.

FIG. 6 is an enlarged view of portion B of FIG. 5.

Reviewing FIG. 6, the second test pad 820 and the first test line 811 are connected to each other through a bridge line 900.

The bridge line 900 is connected to the first test line 811 through a first connection hole 910 and is connected to the second test pad 820 through a second connection hole 920.

When the second test pad 820 is applied with the storage electrode voltage Vcst, the storage electrode voltage Vcst is transferred through the second test line 821. Further, the storage electrode voltage Vcst is transferred to the first test line 811 through the bridge line 900 and is transferred as the common electrode voltage Vcom through the first test line 811.

Figure 7:
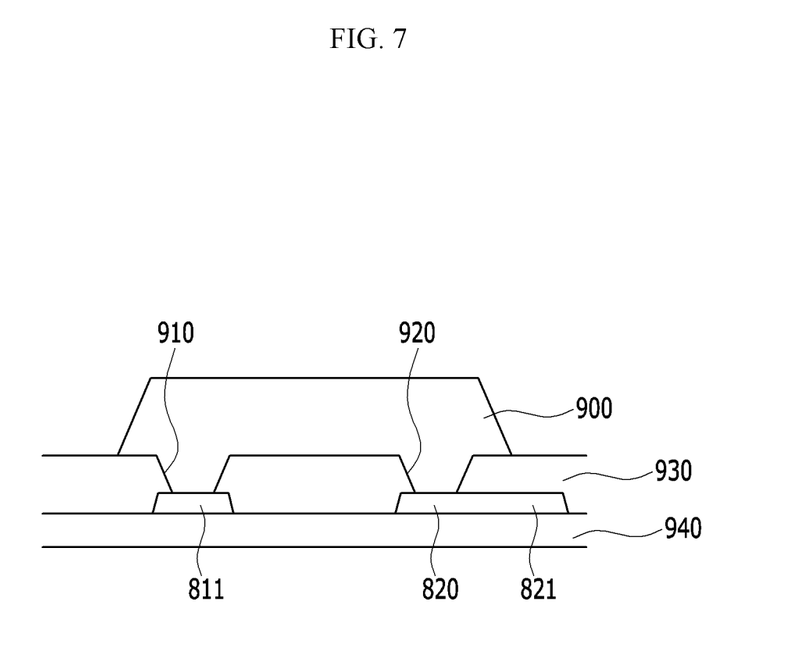
FIG. 7 is a cross-sectional view taken along the line IV-IV' of FIG. 6.

FIG. 7 is a cross-sectional view taken along the line IV-IV' of FIG. 6.

Reviewing FIG. 7, the visual inspection unit includes a substrate 940, the first test line 811, the second test pad 820, an insulating layer 930, and the bridge line 900.

The first test line 811 and the second test pad 820 are positioned on the substrate 940.

The insulating layer 930 is positioned on the substrate 940, the first test line 811, and the second test pad 820 and includes the first connection hole 910 and the second connection hole 920.

The bridge line 900 is positioned on the insulating layer 930 and is connected to the first connection hole 910 and the second connection hole 920.

The bridge line 900 is connected to the first test line 811 for the common electrode voltage through the first connection hole 910 and is connected to the second test pad 820 for the storage electrode voltage through the second connection hole 920.

The bridge line 900 may be positioned on the same layer as the electrode layer of the display panel 100.

The bridge line 900 may be positioned on the same layer as the pixel electrode of the display panel 100. Further, the bridge line 900 may made of a transparent electrode material such as indium tin oxide (ITO) or indium zinc oxide (IZO).

According to the exemplary embodiment of the present invention, the test signal is simultaneously applied to the test line for the common electrode voltage and the test line for the storage electrode voltage through the test pad for the common electrode voltage or the test pad for the storage electrode voltage which are used for the visual inspection, thereby reducing the number of test pads for the visual inspection which are positioned at the outer region of the liquid crystal display and reducing the size of the outer region of the liquid crystal display. Further, it is possible to reduce time taken to contact the pad with the jig pin and easily align the pad and the jig pin at the time of the visual inspection.

According to one exemplary embodiment of the present invention, the bridge line is used as the static electricity dispersion path to reduce the inflow of static electricity and prevent the defect of the liquid crystal display due to the static electricity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a display area including a plurality of pixels; and
   a visual inspection unit positioned in an outer region of the display area and configured to output a test screen to the plurality of pixels,
   wherein:
   the visual inspection unit includes:
      a first test line;
      a second test line extending parallel to the first test line;
      a test pad, to which a test signal is applied, disposed between the first test line and the second test line, directly connected to the first test line, and extending from the first test line in a direction toward the second test line;
      an insulating layer on the test pad and the second test line; and
      a bridge line on the insulating layer and overlapping the test pad and the second test line without overlapping the first test line;
   the insulating layer includes a first connection hole overlapping the test pad and a second connection hole overlapping the second test line;

the bridge line is connected to the test pad through the first connection hole and connected to the second test line through the second connection hole; and a common electrode voltage is applied to the test pad as the test signal.

2. The liquid crystal display of claim 1, wherein:

the visual inspection unit further includes a plurality of test pads to which a plurality of test signals are applied and a plurality of test lines connected to respective ones of the plurality of test pads.

3. The liquid crystal display of claim 1, wherein:

the first test line and the second test line transfer the same signal.

4. A liquid crystal display, comprising:

a display area including a plurality of pixels; and a visual inspection unit positioned in an outer region of the display area and configured to output a test screen to the plurality of pixels, wherein:

the visual inspection unit includes:

a first test line;

a second test line extending parallel to the first test line;

a test pad, to which a test signal is applied, disposed between the first test line and the second test line, directly connected to the second test line, and extending from the second test line in a direction toward the first test line;

an insulating layer on the test pad and the first test line; and    a bridge line on the insulating layer and overlapping the test pad and the first test line without overlapping the second test line;

the insulating layer includes a first connection hole overlapping the first test line and a second connection hole overlapping the test pad;

the bridge line is connected to the first test line through the first connection hole and connected to the test pad through the second connection hole; and a storage electrode voltage is applied to the test pad as the test signal.

5. The liquid crystal display of claim 4, wherein:

the storage electrode voltage applied to the test pad is transferred through the bridge line and the first test line to the plurality of pixels; and the storage electrode voltage applied to the test pad is transferred through the second test line to the plurality of pixels.

6. The liquid crystal display of claim 1, wherein:

the bridge line is made of indium tin oxide (ITO) or indium zinc oxide (IZO).

7. The liquid crystal display of claim 1, wherein:

the common electrode voltage applied to the test pad is transferred through the first test line to the plurality of pixels; and the common electrode voltage applied to the test pad is transferred through the bridge line and the second test line to the plurality of pixels.

\* \* \* \* \*